United States Patent [19]

Agashe et al.

[11] Patent Number: 6,058,338
[45] Date of Patent: May 2, 2000

[54] METHOD AND APPARATUS FOR EFFICIENT GPS ASSISTANCE IN A COMMUNICATION SYSTEM

[75] Inventors: Parag A. Agashe; Alkinoos Hector Vayanos; Samir S. Soliman, all of San Diego, Calif.

[73] Assignee: Qualcomm Incorporated, San Diego, Calif.

[21] Appl. No.: 09/250,771

[22] Filed: Feb. 12, 1999

[51] Int. Cl.[7] .................................................. G06F 7/70
[52] U.S. Cl. ..................... 701/13; 701/213; 244/158 R; 342/355; 356/139.01
[58] Field of Search ................. 701/13, 213; 244/158 R; 356/139.01; 342/355

[56] References Cited

U.S. PATENT DOCUMENTS 5,430,657  7/1995  Kyrtsos ..................................... 364/459
5,862,495  1/1999  Small et al. ............................... 701/13

*Primary Examiner*—William A. Cuchlinski, Jr.
*Assistant Examiner*—Olga Hernandez
*Attorney, Agent, or Firm*—R. Ben Miller; Bruce W. Greenhaus

[57] ABSTRACT

A method and apparatus for efficiently transmitting location assistance information to a mobile communication device over a control channel with a minimal impact on the capacity of the control channel. A position location server provides a difference between satellite locations which have been computed using Almanac data and then Ephemeris data. Sending only the difference between the locations and clock corrections computed using the two different data types, the total amount of information to be transmitted to a mobile communication device is significantly reduced. Furthermore, by providing rate of change information, the method and apparatus allows the location assistance information to remain valid for a relatively long time after it is has been received by the mobile communication device.

2 Claims, 5 Drawing Sheets

METHOD AND APPARATUS FOR EFFICIENT GPS ASSISTANCE IN A COMMUNICATION SYSTEM

BACKGROUND OF THE INVENTION

I. Field of the Invention

The present invention relates generally to position location systems. More particularly, the present invention relates to systems and methods for determining the physical location of a mobile telephone within a cellular communication system.

II. Description of the Related Art

Recent developments in global positioning satellite (GPS) systems and terrestrial mobile communications make it desirable to integrate GPS functionality into a mobile communication device, such as a mobile telephone, in order to support various position location functions and features. A wireless link exists between a mobile communication device within a terrestrial mobile communications system and a base station within the communications system. A base station is typically a stationary communication device that receives wireless communications from, and transmits wireless communications to, a wireless mobile communication device. The base station also communicates with communication networks to complete the connection between the mobile communication device and an end-point device, such as another mobile communication device, a conventional telephone, a computer or any other such device. This wireless link may be used to communicate position location information between the mobile communication device and the base station in order to improve the performance of the GPS receiver within the mobile communication device. In particular, certain functions that must be performed in order to locate the position of a mobile communication device in accordance with a GPS system can be performed by the base station, rather than by the communication device. By "off-loading" some of the functions to the base station, the complexity of the communication device can be reduced. Furthermore, since the base station is stationary, the location of the base station can be used to assist in locating the position of the communication device.

Many services, such as CDMA Tiered Services (described in industry standard TR45.5.2.3/98.10.xx.xx, CDMA Tiered Services Stage 2 Description, Version 1.1, published by the Telecommunication Industry Association/Electronics Industry Association (TIA/EIA)), require a wireless telephone to be capable of determining its location while in an idle state. The location must then be displayed to the user. In the idle state, the wireless telephone monitors transmissions from a base station over a control channel broadcast by the base station. For example, in an industry standard IS-95 CDMA system (as defined by industry standard IS-95, published by the TIA/EIA), the base station transmits a paging channel. Each of the telephones capable of receiving signals from a particular base station will monitor information broadcast on the control channel to determine whether incoming calls or other data are intended for that telephone.

A GPS receiver typically measures the range to at least four GPS satellites. If the locations of the satellites and the ranges from the phone to the satellite are known at the time the measurement is made, then the location of the phone can be computed. Since GPS satellites orbit around the Earth, the relative position of the GPS satellites with respect to the earth changes with time. The location of a GPS satellite can be determined by having a description of the orbit of the satellite along with the time when the satellite position is to be computed. The orbits of GPS satellites are typically modeled as a modified elliptical orbit with correction terms to account for various perturbations.

In a GPS system, the orbit of the satellite can be represented using either an "Almanac" or an "Ephemeris". An Ephemeris provides data that represents a very accurate representation of the orbit of the satellite. An Almanac provides data that represents a truncated reduced precision set of the parameters provided by the Ephemeris. Almanac data is much less accurate than the detailed Ephemeris data. Almanac accuracy is a function of the amount of time that has elapsed since the transmission. Table 1 shows the relationship between the age of the information (i.e., amount of time which has elapsed since the information was transmitted) and the accuracy of the information.

TABLE 1

| Age of data time (from transmission) | Almanac Accuracy (m) |
| --- | --- |
| 1 day | 900 |
| 1 week | 1200 |
| 2 weeks | 3600 |

In addition, the Almanac provides truncated clock correction parameters. The almanac time correction provides the time to within 2 $\mu$sec of GPS time. However, the satellite location and clock correction computed using Almanac data are not useful to compute the location of the phone because of the low accuracy as shown in the above Table 1.

Certain methods for computing the location of a device require measuring the ranges to the satellites at the wireless phone, and then transmitting these ranges to a server connected to the base station. The base station uses these ranges, along with the locations of the satellites at the time the range measurements were made, to compute the location of the phone. This computed location may be displayed to the user or sent to any other entity that needs the location. This method is suitable for a phone that has a dedicated traffic channel. However, this method is not suitable for phones in the idle state, because the phone lacks a dedicated traffic channel over which to send the information to the base station during idle state.

In the absence of a dedicated traffic channel over which to communicate with the base station, the phone may use a shared access channel to send information to the base station. However, transmitting measured ranges to the base station over the shared access channel (which is commonly used to establish a call to or from the phone) can have a significant impact on the capacity of the shared access channel and on the life of the battery that powers the phone. Hence, it is not practical to transmit measured ranges to the base station. This requires that the phone be able to compute its own location. In order to do so, the phone must know the locations of the GPS satellites, and the errors in the GPS satellite clock (since an accurate GPS satellite clock is required to determine the range measurements accurately). This information must be transmitted to the phone over the control channel. However, even transmitting this information to the phone creates a significant burden on the control channel.

Under conventional conditions, the control channel has to carry very large amounts of information. The control channel has a limited capacity to carry messages. Hence, it is not possible to convey extensive GPS information over the control channel. Furthermore, the information must be transmitted in a form that allows the information to be used for a relatively long time after it has been received.

These problems and deficiencies are recognized and solved by the present invention in the manner described below.

SUMMARY OF THE INVENTION

This method and apparatus disclosed herein efficiently transmits location assistance information to a mobile communication device over a control channel with a minimal impact on the capacity of the control channel. A position location server provides a difference between satellite locations which have been computed using Almanac data and then Ephemeris data. Sending only the difference between the locations and clock corrections computed using the two different data types, the total amount of information to be transmitted to a mobile communication device is significantly reduced. Furthermore, by providing rate of change information, the method and apparatus allows the location assistance information to remain valid for a relatively long time after it is has been received by the mobile communication device.

BRIEF DESCRIPTION OF THE DRAWINGS

The features, objects and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

This disclosed method and apparatus provides a novel way to reduce the amount of information that needs to be transmitted between a mobile communication device and a base station. In particular, the disclosed method and apparatus reduces the amount of information required to be transmitted by using two types of information available for determining position location. The first type of information is less accurate, but more efficient information (such as Almanac data provided by global positioning satellites (GPS)). The second type of information is more accurate, but less efficient information (such as Ephemeris data provided by GPS satellites). The disclosed method and apparatus minimizes the impact on the capacity of a communication channel (such as a control channel), and, in accordance with one embodiment, maximizes the amount of time for which the transmitted information is valid.

Figure 1:
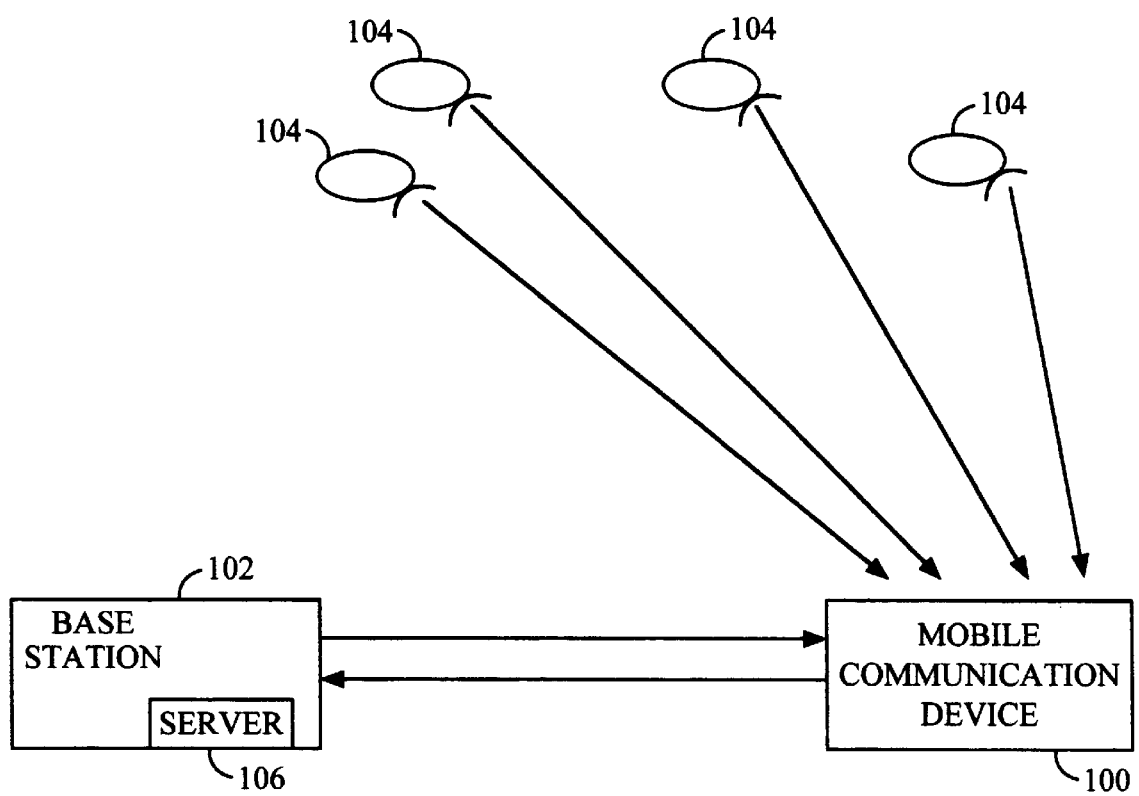
FIG. 1 is high level block diagram of the components of a communication system using a satellite position location system (such as a GPS system) to locate a mobile communication device.

FIG. 1 is high level block diagram of the components of a communication system using a satellite position location system (such as a GPS system) to locate a mobile communication device. The communication system includes a mobile communication device 100 and a base station 102. The mobile communication device 100 may be any device that is capable of communicating with a base station over a wireless connection (such as a wireless telephone, computer with wireless modem, or facsimile machine with wireless modem). The base station 102 is any device that is capable of receiving wireless transmissions from the mobile communication device 100. Typically, such a base station 102 will interface the mobile communication device 100 with a land based communication network, such as the public switched telephone network (PSTN) or the internet.

In accordance with one embodiment of the disclosed method and apparatus, the base station 102 includes a position location server 106 (such as a GPS server). Alternatively, the position location server 106 is located apart from the base station 102 and communicates with the base station 102 over a communication link. The communication link between the base station 102 and the server 106 may take any form that allows information to be communicated from the mobile communication device 100 to the server 106 via the base station 102. In one alternative embodiment of the disclosed method and apparatus, the functions described herein as being performed by the position location server 106 are performed directly by the base station 102. Accordingly, in such an embodiment, no discrete position location server is required.

Figure 2:
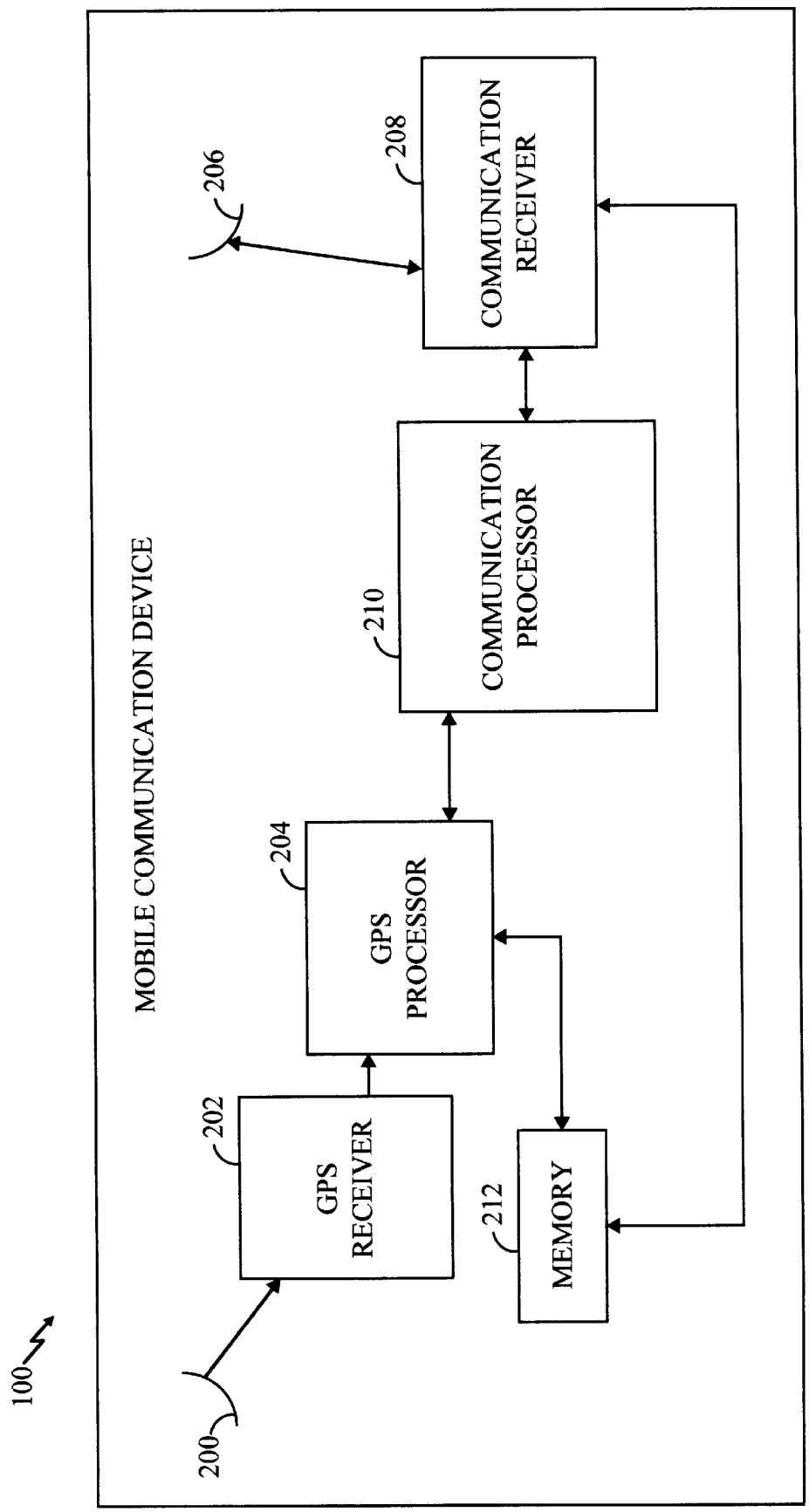
FIG. 2 is a high level block diagram of the mobile communication device in accordance with the disclosed method and apparatus.

FIG. 2 is a high level block diagram of the mobile communication device 100. The mobile communication device 100 includes a position location antenna 300, a position location receiver 302, a position location processor 304, a communication antenna 306, a communication receiver 308, a communication processor 310, and a memory 312.

Figure 3A:
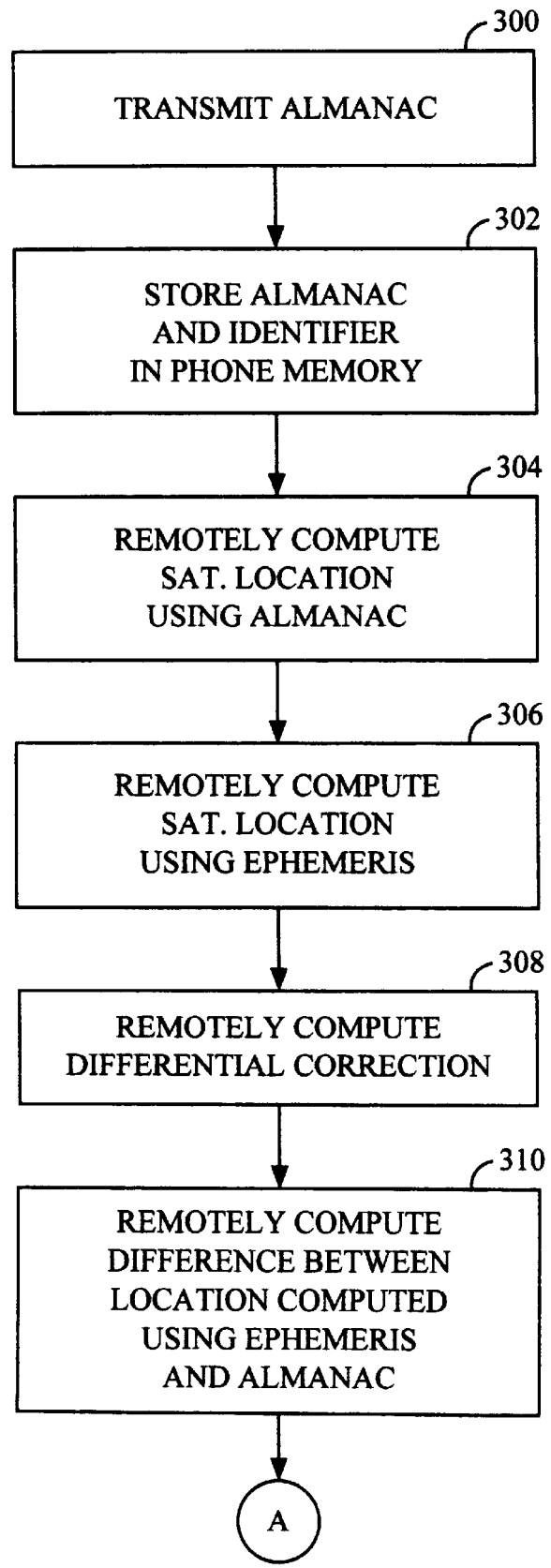
FIGS. 3a–3c illustrate the steps to be performed by the disclosed method.
Figure 3B:
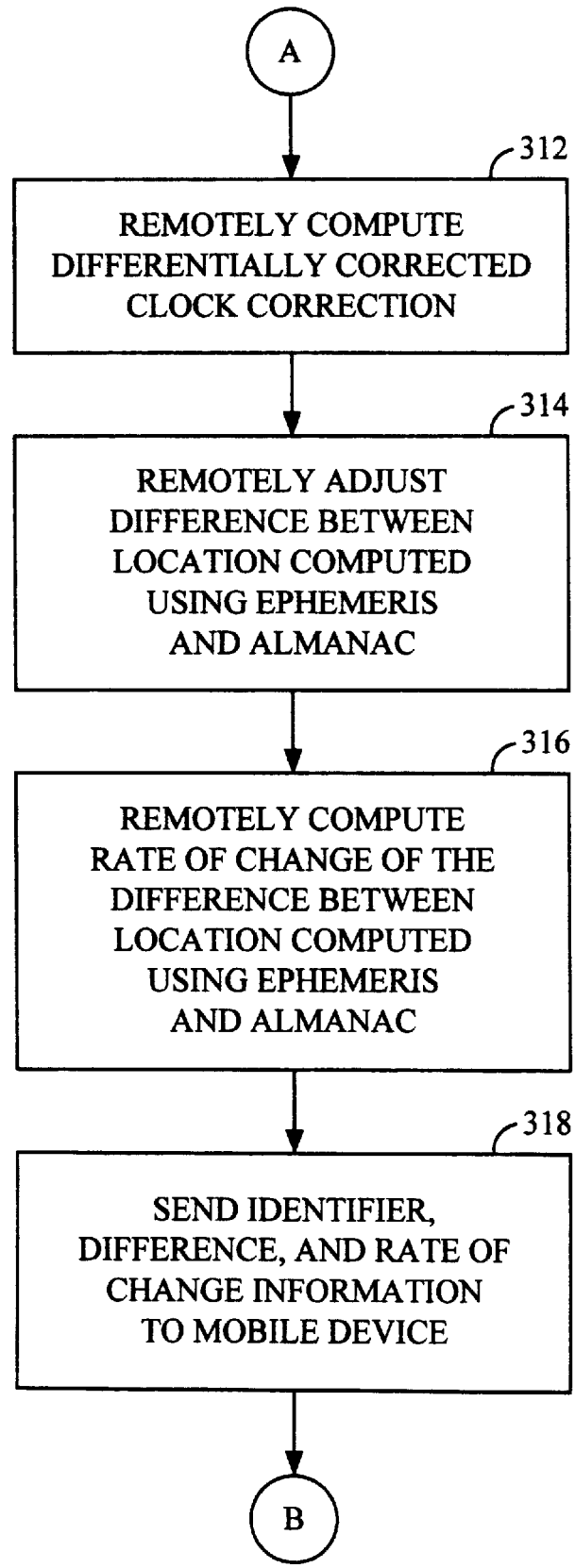
Figure 3C:
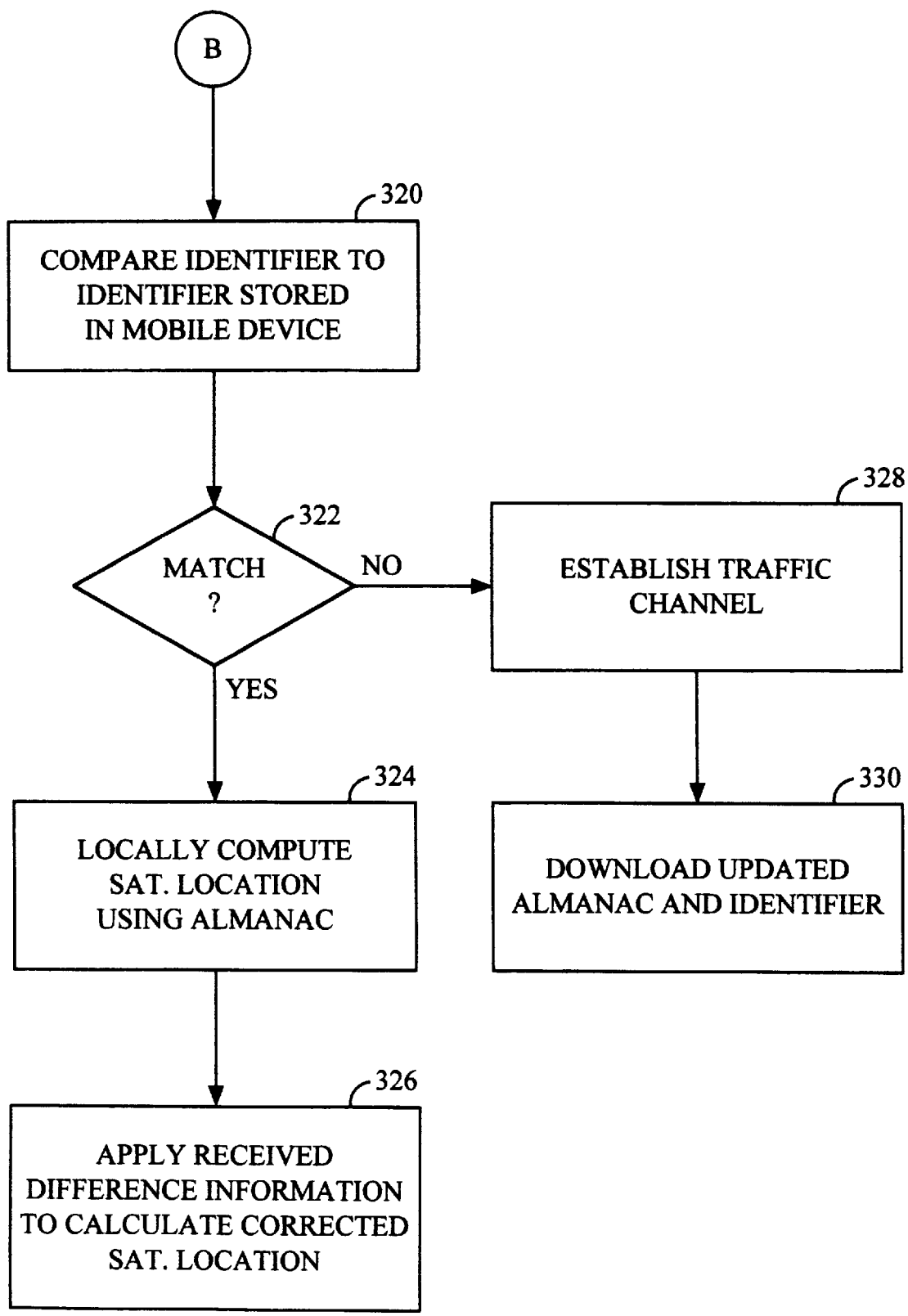

FIG. 3a through FIG. 3c illustrate the steps performed in accordance with the disclosed method. Initially, the position location server 106 transmits to the mobile communication device 100, information regarding the orbits of each of the satellites 104 from which the mobile communication device 100 is likely to receive position location signals (STEP 300). In accordance with one embodiment, this information is communicated by the position location server 106 to the base station 102. The information is then transmitted over the air from the base station 102 and received by the communication antenna 306 within the mobile communication device 100. The signals received by the communication antenna 306 are coupled to the communication receiver 308. The communication receiver 308 performs any necessary radio frequency processing (such as filtering, down converting, amplification, etc.). Such radio frequency processing is well known to those skilled in the art. The output from the communication receiver 308 is coupled to the communication processor 310.

The communication processor 310 extracts from the received signals the information regarding the orbits of the position location satellites. Extraction of this information is well known to those of ordinary skill in the art. This information is provided in the well known "Almanac" format. Together with the Almanac, the mobile communication device 100 receives an "Almanac Identifier". The Almanac Identifier uniquely identifies the Almanac with which the Identifier was transmitted. The mobile communication device 100 stores the Almanac and an Almanac Identifier in its memory 312 (STEP 302). In accordance with one embodiment of the disclosed method and apparatus, the Almanac Identifier is a number that represents the period of time (such as a week) for which the Almanac is valid.

At any time relative to transmitting the Almanac and Almanac Identifier to the mobile communication device 100 (either before, during or after such transmission), the position location server 106 uses the transmitted Almanac to compute the location of a satellite to which the Almanac is relevant (STEP 304). In addition, a clock correction is calculated using the Almanac. The clock correction is calculated at a time $t_0$. Such clock correction accounts for clock errors that result from errors in the satellite clock. Methods for calculating such clock corrections are well known to those skilled in the art.

The location of a particular satellite 104 at time $t_0$ as computed from the Almanac is denoted as ($x_{0a}$, $y_{0a}$, $z_{0a}$). The clock correction for the satellite computed from the Almanac at time $t_0$ is denoted as $C_{0a}$.

Next, the position location server 106 computes the location of the satellite and the clock correction using well known "Ephemeris" data at time $t_0$ (STEP 306). It will be understood by those skilled in the art that Ephemeris data is necessary in any accurate GPS position location system. Both Ephemeris data and Almanac data are received from the Satellite in real-time. The location of the satellite 104 computed from the Ephemeris at time $t_0$ is denoted as ($x_{0e}$, $y_{0e}$, $z_{0e}$). It should be understood that the satellite for which the values ($x_{0a}$, $y_{0a}$, $z_{0a}$) were computed (i.e., the satellite from which the Almanac was received) is the same as the satellite for which the values ($x_{0e}$, $y_{0e}$, $z_{0e}$) were computed (i.e., the satellite from which the Ephemeris was received ). The clock correction for the satellite computed from the Ephemeris at time $t_0$ is denoted as $c_{0e}$.

The position location server 106 also computes the differential correction to be applied to the range measured from the satellite 104 (STEP 308). The differential correction is applied to correct for clock errors that are intentionally introduced by the satellite for historical reasons which are unrelated to the disclosed method and apparatus. The differential correction is denoted as $d_0$.

The position location server 106 computes the difference between the location x, y and z and the clock correction of the satellite obtained from the Almanac and the Ephemeris (STEP 310). The difference in location at time $t_0$ is expressed as:

$$\Delta x_0 = x_{0e} - x_{0a}$$

$$\Delta y_0 = y_{0e} - y_{0a}$$

$$\Delta z_0 = z_{0e} - z_{0a}$$

$$\Delta c_0 = c_{0e} - c_{0a}$$

The base position location server 106 also computes a value, $\Delta c_{0d} = \Delta c_0 + d_0$ which represents the clock correction $\Delta c_0$ after differential correction has been added (STEP 312). The corrected clock value, $\Delta C_{0d}$ is then used to adjust the values of $\Delta x_0$, $\Delta y_0$, and $\Delta z_0$ (STEP 314).

The base station computes the rate of change of the corrections, $\Delta x_0$, $\Delta y_0$, $\Delta z_0$, and $\Delta c_{0d}$ (STEP 316). We denote the rate of change of $\Delta x_0$ as $\Delta \dot{x}_0$, the rate of change of $\Delta y_0$ as $\Delta \dot{y}_0$, the rate of change of $\Delta z_0$ as $\Delta \dot{z}_0$, and the rate of change of $\Delta c_{0d}$ as $\Delta \dot{c}_{0d}$. In accordance with one embodiment of the disclosed method and apparatus, the rate of change values are computed by taking the difference between two locations at two point in time and identifying the slope of the line between them in each direction x, y, and z.

The position location server 106 sends $t_0$, $\Delta x_0$, $\Delta y_0$, $\Delta z_0$, $\Delta c_{0d}$, $\Delta \dot{x}_0$, $\Delta \dot{y}_0$, $\Delta \dot{z}_0$, $\Delta \dot{c}_{0d}$ for each satellite to the mobile communication device (STEP 318). In accordance with one embodiment of the disclosed method and apparatus, these values are sent via a control channel, such as the shared access channel defined by industry standard IS-95B, published by the Telecommunications Industry Association/Electronics Industry Association (TIA/EIA). Along with this information, the position location server 106 sends an Identifier to identify the Almanac that the server 106 used in computing these corrections.

The mobile communication device receives the information over the control channel. The mobile communication device compares the Identifier of the Almanac used by the server 106 with the Identifier of the Almanac stored in its memory 312 (STEP 320).

If the Identifiers match (STEP 322), then the mobile communication device computes the location of each satellite 104 and each satellite clock correction using the Almanac at time $t_1$ (STEP 324). Time $t_1$ may not necessarily be the same as time $t_0$. The satellite locations and clock correction computed by the phone at time $t_1$ are denoted as ($x_{1a}$, $y_{1a}$, $z_{1a}$), and $c_{1a}$ respectively.

The mobile communication device applies the corrections received over the control channel to the satellite locations and satellite clock computed using the Almanac (STEP 326). This yields the corrected satellite location and clock correction. These can be written as:

$$x_1 = x_{1a} + \Delta x_0 + (t_1 - t_0)\Delta \dot{x}_0$$

$$y_1 = y_{1a} + \Delta y_0 + (t_1 - t_0)\Delta \dot{y}_0$$

$$z_1 = z_{1a} + \Delta z_0 + (t_1 - t_0)\Delta \dot{z}_0$$

$$c_1 = c_{1a} + \Delta c_{0d} + (t_1 - t_0)\Delta \dot{c}_{0d}$$

The mobile communication device uses these corrected satellite locations and clock along with range measurements to the satellite to compute its own location. The position location signals are received by the position location antenna 300. The position location antenna 300 is coupled to the position location receiver 302. The position location receiver 302 performs any necessary front end radio frequency processing. The position location receiver 302 is coupled to the position location processor 304. The position location processor determines the distance to each satellite 104 in conventional fashion and then determines its own position using the locations of each satellite 104.

If the Identifier of the Almanac used by the base station does not match (STEP 322) the Identifier of the almanac stored in the mobile communication device's memory 312, the mobile communication device sets up a traffic channel (STEP 328), and downloads the new Almanac from the server 106 via the base station 102 (STEP 330).

In the preferred embodiment of the disclosed method and apparatus, the information sent over the control channel includes the location and clock corrections, and their first order differentials with respect to time (rate of change) $\Delta \dot{x}_0$, $\Delta \dot{y}_0$, $\Delta \dot{z}_0$ and $\Delta \dot{c}_{0d}$. An alternate embodiment may include higher order differentials with respect to time. Another alternate embodiment may exclude the rate of change terms altogether.

In the preferred embodiment, the differential correction for the ranges measured by the phone is accomplished by applying a correction to the clock correction term $\Delta c_0$ to obtain $\Delta_{0d}$. In other embodiments, differential correction of the ranges can be achieved by applying correction terms to the satellite location corrections $\Delta x_0$, $\Delta y_0$, $\Delta z_0$ instead of to the clock correction term $\Delta c_0$.

Although the invention refers specifically to a Global Positioning System, these same principles can be applied to other satellite based location systems such as GLONASS.

Furthermore, references to IS-95 CDMA systems are provided only as an example of a particular communication system. However, the disclosed method and apparatus has applicability to other wireless communications systems, where it is desirable to reduce the amount of information to be transmitted between an mobile communication device and a position location server.

Since the only information transmitted over the control channel is the difference between the location and clock correction computed from the Ephemeris and the Almanac a small number of bits can be used to convey this information. Other methods of sending the satellite location information such as sending the Ephemeris parameters or the actual location of the satellite require many more bits to transmit the information. Such methods are much more expensive in terms of capacity of the control channel.

The corrections transmitted to the mobile communication device in disclose method and apparatus are valid for a long window of time after the time of transmission due to the inclusion of rate of change information. Hence, the mobile communication device can use this information at a time different from the time when it was transmitted. This means that the mobile communication device can compute its own location at any time, and is not restricted to location computation within a small window of time around the time when the information is transmitted. Other ways of sending the satellite information are valid only for a very short window of time after they are transmitted.

The disclosed method and apparatus is provided to enable any person skilled in the art to make or use the present invention. The various modifications to the disclosed method and apparatus will be readily apparent to those skilled in the art, and the generic principles defined herein may be applied to other embodiments without the use of inventive faculty. Thus, the present invention is not intended to be limited to the methods and apparatuses shown herein but is to be accorded the widest scope consistent with the claims set forth below.

What is claimed is:

1. A method for calculating the position of a satellite, including the steps of:

a) transmitting Almanac data to a mobile communication device;

b) computing the location of the satellite at a first point in time using the transmitted Almanac data;

c) computing the clock correction for the satellite at the first point in time using the transmitted Almanac data;

d) computing the location of the satellite at the using Ephemeris data at the first point in time;

e) computing the satellite clock correction for the satellite at the first point in time using the Ephemeris data;

f) computing difference between the location and satellite clock correction computed using the transmitted Almanac data and the location and clock correction using the Ephemeris data; and g) transmitting to the mobile communication device the computed differences.

2. A server for calculating information that assists in locating the position of satellites, including:

a) an output port capable of outputting an Almanac and satellite location information, including information regarding the difference between clock corrections and locations computed based upon Almanac and Ephemeris data; and b) a processor, coupled to an output port, capable of:

i) computing the location of a satellite based upon the Almanac;

ii) computing the satellite clock correction based upon the Almanac;

iii) computing the location of the satellite based upon the Ephemeris;

iv) computing the satellite clock correction based upon the Ephemeris; and v) computing the difference between the location and satellite clock corrections which were computed based upon the Almanac and the Ephemeris.

* * * * *